United States Patent
Ahmad et al.

(10) Patent No.: US 12,088,639 B2
(45) Date of Patent: Sep. 10, 2024

(54) ENRICHED CALLING

(71) Applicant: T-MOBILE USA, INC., Bellevue, WA (US)

(72) Inventors: Syed Toaha Ahmad, Bellevue, WA (US); Karthik Iyer, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/186,096

(22) Filed: Feb. 26, 2021

(65) Prior Publication Data

US 2021/0281614 A1 Sep. 9, 2021

Related U.S. Application Data

(60) Provisional application No. 62/985,556, filed on Mar. 5, 2020.

(51) Int. Cl.
| | |
|---|---|
| *H04L 65/1104* | (2022.01) |
| *H04L 51/046* | (2022.01) |
| *H04L 51/063* | (2022.01) |
| *H04L 65/1016* | (2022.01) |
| *H04L 65/1069* | (2022.01) |

(52) U.S. Cl.
CPC ........ *H04L 65/1069* (2013.01); *H04L 51/046* (2013.01); *H04L 51/063* (2013.01); *H04L 65/1016* (2013.01); *H04L 65/1104* (2022.05)

(58) Field of Classification Search
CPC . H04L 51/046; H04L 51/063; H04L 65/1005; H04L 65/1016; H04L 65/1069; H04L 65/1104
See application file for complete search history.

(56) References Cited

U.S. PATENT DOCUMENTS

| | | | | |
|---|---|---|---|---|
| 2016/0248814 | A1* | 8/2016 | Mufti | .................... H04L 67/327 |
| 2017/0223065 | A1* | 8/2017 | Fan | ...................... H04L 65/1104 |
| 2018/0295234 | A1* | 10/2018 | Kumar Selvaraj | ......................... H04L 65/1006 |

FOREIGN PATENT DOCUMENTS

WO WO-2020141959 A1 * 7/2020 ............ H04W 48/18

* cited by examiner

*Primary Examiner* — Ryan J Jakovac
(74) *Attorney, Agent, or Firm* — Lee & Hayes, P.C.

(57) ABSTRACT

Systems and methods of providing enriched call elements within outbound voice or video calls using rich communication services (RCS) are disclosed. The techniques include initiating a voice or video call from a first RCS-compatible device to a second RCS-compatible device, automatically sending an RCS invite or instant message including enriched call elements added from a business data server or from the first RCS-compatible device to the second RCS-compatible device, and presenting an indication of the enriched call elements to a user of the second RCS-compatible device concurrent with or prior to answering the voice or video call. Such enriched call elements may include location data, call priority data, call subject matter data, electronic images, or video clips.

15 Claims, 4 Drawing Sheets

ENRICHED CALLING

CROSS-REFERENCE TO RELATED APPLICATIONS

The present disclosure is a nonprovisional application claiming priority to U.S. Provisional Patent Application No. 62/985,556 filed on Mar. 5, 2020, the disclosure of which is hereby incorporated herein by reference in its entirety.

FIELD OF THE DISCLOSURE

The present disclosure relates to techniques for including additional data in a voice and video call using Rich Communication Services (RCS) capabilities of user equipment concurrent with or prior to the voice or video call being answered.

BACKGROUND

Many modern cellular communication networks, in addition to supplying voice connectivity, also include a Rich Communication Services (RCS) messaging infrastructure. RCS is an industry initiative adopted by the GSM Association (GSMA) starting in 2008 that comprises a Universal Profile specifying delivery of IP multimedia services, such as telephony, voice over IP (VOIP), instant messaging, photo, video messaging, and/or other services. Carriers that deploy the RCS Universal Profile are working on interconnection with other carriers. User Equipment (UE) manufacturer have agreed to produce RCS capable UE devices to the same specifications. RCS may be used with VoIP and IMS core infrastructure and may also be used concurrent with legacy circuit switched voice calls assuming support of RCS at the UE and at an RCS messaging server (RMS) as part of the network. RCS and GSMA specifications include two different categories of data messaging. RCS Session based messaging uses the Session Initiation Protocol (SIP), Session Description Protocol (SDP), and Message Session Relay Protocol (MSRP) to establish a message session. A SIP INVITE message is used to initiate the session and a SIP acceptance message, such as a 200 OK message is generated by the recipient or a network entity to accept the session. Standalone messaging is another simpler but more limited type of RCS messaging that can also be used inside a session or independent of a session. A SIP MESSAGE command is used to transmit data as a Standalone message, and a "200 OK" message confirms the receipt.

BRIEF SUMMARY

As described further herein, the disclosure generally relates to systems, methods, and non-transitory computer-readable media storing instructions for adding rich communication services (RCS) data to voice or video calls.

According to a first aspect of the disclosure herein, the techniques may include the following: initiating a voice or video call from a first RCS-compatible device to a second RCS-compatible device; sending an invite message to request an RCS session from the first RCS-compatible device to the second RCS-compatible device; receiving an acceptance message, such as a 200 OK message at the first RCS-compatible device in response to the invite message; and adding enriched call elements to a message from the first RCS-compatible device to the second RCS-compatible device in the RCS session. Enriched call elements may include electronic photographs, video-clips, geographic location data, priority level or urgency of the call, or the subject matter of the call. Receiving the enriched call elements causes the second RCS-compatible device to present an indication of the enriched call elements to a user of the second RCS-compatible device. In some embodiments, the second RCS-compatible device presents the indication of the enriched call elements to the user prior to the user answering the voice call. The elements may be present for viewing anytime during the call and available in call logs after the call is ended.

In some embodiments, adding the enriched call elements to a voice or video call to the second RCS-compatible device comprises automatically sending an RCS message from the first RCS-compatible device to the second RCS-compatible device after receiving the acceptance message. In some embodiments, an image or video-clip is uploaded to RMS or file store entity before the call is placed. In further embodiments, adding the enriched call elements to a message to the second RCS-compatible device comprises automatically adding the enriched call elements to the invite message. In still further embodiments, the first RCS-compatible device may identify the second RCS-compatible device by obtaining from a Presence Server (PS) an indication that inclusion of the enriched call elements is supported by at least one of the first RCS-compatible device or the second RCS-compatible device. In some embodiments, the first RCS-compatible device may obtain from a Home Subscriber Server (HSS) or a Home Location Register (HLR) an indication that the first or second RCS-compatible devices have subscribed to and enabled the enriched call elements feature or service from the carrier.

In various embodiments, the enriched call elements comprise one or more of the following: an electronic photograph, a video clip, a geographical location of the first RCS-compatible device or subject matter of the call. In further embodiments, the enriched call elements comprise a priority indicator associated with a priority level of the voice or video call as selected by a sender associated with the first RCS-compatible device prior to initiating the voice or video call. In some such embodiments, receiving the priority indicator causes the second RCS-compatible device to indicate the priority level of the voice call by a special notification at the second RCS-compatible device prior to answering the voice or video call. In still further embodiments, the first RCS-compatible device may receive an indication of a subject of the voice or video call from a sender associated with the first RCS-compatible device prior to initiating the voice or video call. The enriched call elements may comprise the subject of the voice or video call based upon the indication received at the first RCS-compatible device. Upon receiving such subject of the voice or video call in the enriched call elements, the second RCS-compatible device indicates the subject of the call to the user of the second RCS-compatible device prior to answering the voice or video call. Additional embodiments described in further detail below may likewise be implemented.

According to a second aspect of the disclosure herein, the techniques may include the following: initiating a voice or video call from a first RCS-compatible device to a second RCS-compatible device; and sending an RCS message including enriched call elements from the first RCS-compatible device to the second RCS-compatible device, such that the RCS message including the enriched call elements is sent prior to the second RCS-compatible device answering the voice or video call. Receiving the enriched call elements causes the second RCS-compatible device to present an indication of the enriched call elements to a user of the second RCS-compatible device. In some embodiments, sending the RCS message including the enriched call elements comprises sending a stand-alone session initiation protocol (SIP) instant message not within a previously established RCS session. Additional embodiments similar to those indicated above or described in further detail below may likewise be implemented.

According to a third aspect of the disclosure herein, the techniques may include the following: receiving at a first RCS-compatible device a voice or video call from a second RCS-compatible device; receiving an invite message from the second RCS-compatible device to request an RCS session; sending a 200 OK message to the second RCS-compatible device in response to the invite message; receiving enriched call elements in a message from the second RCS-compatible device in the RCS session prior to answering the voice or video call; and in response to receiving the enriched call elements, presenting an indication of the enriched call elements to a user of the RCS-compatible device prior to answering the voice or video call. Additional embodiments similar to those indicated above or described in further detail below may likewise be implemented.

Systems or computer-readable media storing instructions for implementing all or part of the systems and methods described above may also be provided in some aspects. Systems for implementing such methods may include or one or more mobile computing devices and/or one or more servers. Additional or alternative features described hereinafter may be included in some aspects.

BRIEF DESCRIPTION OF THE DRAWINGS

The Figures described below depict various aspects of the applications, methods, and systems disclosed herein. It should be understood that each Figure depicts an embodiment of a particular aspect of the disclosed applications, systems and methods, and that each of the Figures is intended to accord with one or more possible embodiments thereof. Furthermore, wherever possible, the following description refers to the reference numerals included in the following Figures, in which features depicted in multiple Figures are designated with consistent reference numerals.

Advantages will become more apparent to those skilled in the art from the following description of certain embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Figure 1:
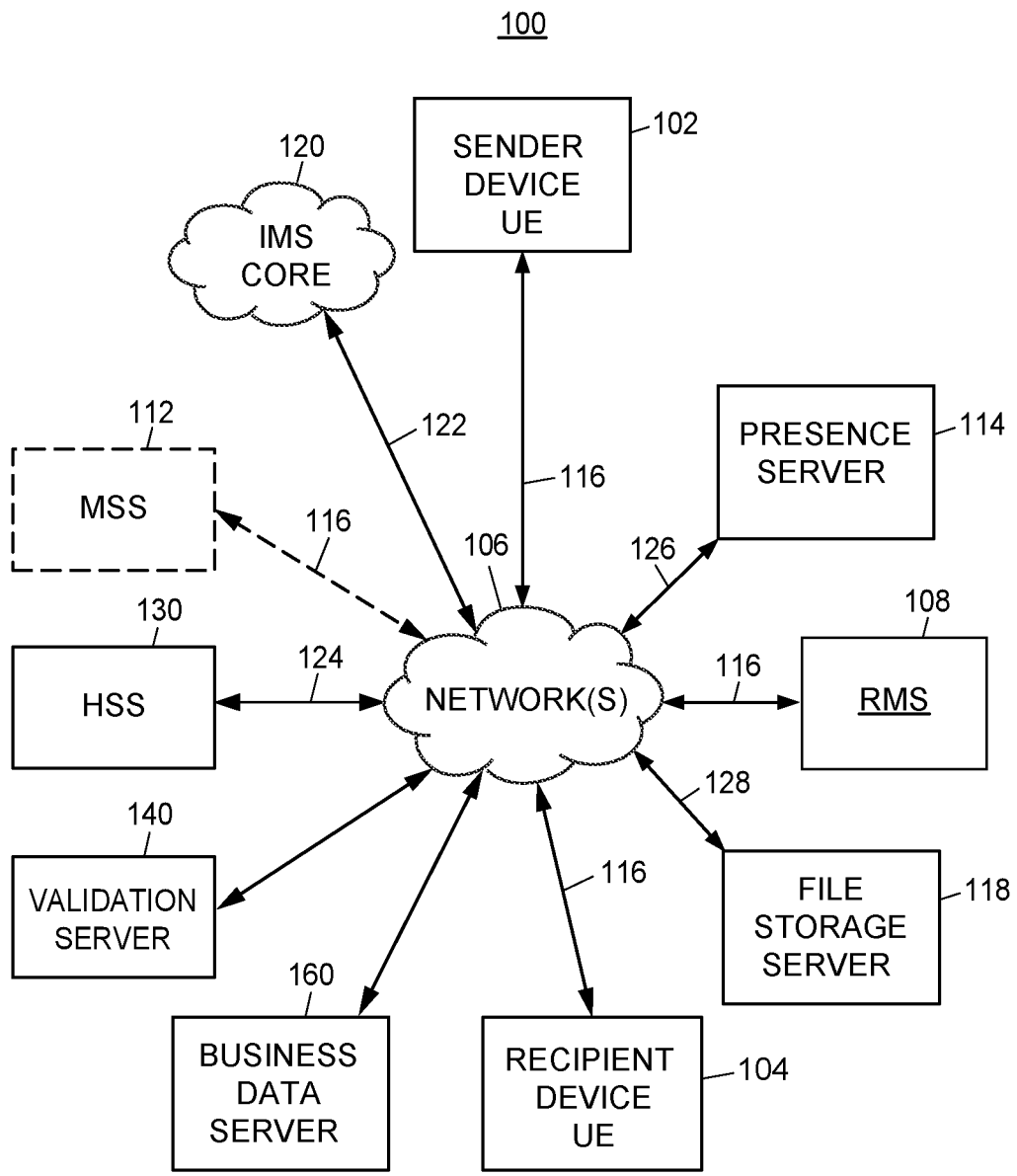
FIG. 1 illustrates a block diagram illustrating a telecommunication system for implementing a voice or video call with RCS enriched call elements according to some implementations.

With the rise of smartphone and tablet usage, devices sending and receiving voice or video calls are also capable of receiving, processing, and displaying other types of information, such as text, images, or video clips. As used herein, "call" refers to video or voice calls, which may be delivered by circuit or by Internet protocol. There are times when end users desire to communicate additional data with voice or video calls to recipients of such calls, either by communicating the additional data with all calls (e.g., in the case of some business account users) or by communicating additional data to specific recipients of specific calls. Thus, individual or business users may selectively transmit additional data to be presented to a call recipient prior answering the call. For example, a user may wish to indicate that a particular voice or video call is important or a subject matter of the call. Such additional information may provide useful context to the recipient, thereby increasing the call pickup rate. Device users that are part of a business account may present an indication in the data presented to the recipient or in the metadata that the call is coming from a business account. The data or metadata, such as an organizational header indicating the sender is a business, may be used by the network to skip the enriched calling feature validation that might otherwise be necessary for an individual account. The recipient may also use that indication information to judge the importance of the call. The business may additionally wish to automatically include certain other data in outbound voice or video calls, without having to specify the inclusion of such information with each outbound call. For example, a ride-share driver or a delivery person may automatically communicate their current global positioning system (GPS) location or communicate a photo of the last picture taken, which might be a package that was delivered, with every outbound voice or video call, without specific per-call user instructions. Alternately the business may simply want to automatically communicate the type of business that is calling, such as "Ride-Share", "Package Delivery" or some other data. Using standard RCS messaging only, sending such additional information takes several additional steps on the part of the user, usually by starting a separate application and selecting the data in addition to the setup of a voice or video call.

The described implementations provide devices, systems, and methods that allow enriched call elements services to be provided within a Rich Communication Services (RCS) messaging infrastructure prior to answering a voice or video call. This data may automatically be inserted with every voice or video call or selectively inserted by the sender. Enriched call elements may include, for example, a priority level of the call, a subject matter of the call, a picture, a video clip, a geographic location, or other data. In certain described embodiments, an RCS-compatible sender may send enriched call elements to an RCS messaging server (RMS) and further to the receiving device, prior to the recipient answering a voice or video call.

In embodiments using a "session-based" approach, the RCS messaging infrastructure may extend a Session Initiation Protocol (SIP) INVITE message containing an additional enriched call elements parameter. In some embodiment, client messaging applications executing on the sender device and the recipient device may be configured to receive enriched call elements input and add an enriched call elements parameter to the SIP INVITE message or to include an enriched call elements parameter as part of a subsequent message during an RCS session. In further embodiments, the client messaging applications may be configured to include the enriched call elements parameter in a SIP MESSAGE. An instant SIP MESSAGE either may independently or after a session is established with a standard INVITE/200 OK sequence. Thus, in some embodiments, a SIP MESSAGE may be used as an instant message outside of an RCS session to send the enriched call elements. In further embodiments, using a "message-based" approach, the format of the RCS message may itself be extended to enable the sender device to input the enriched call elements parameter. That is, a client messaging application executing on the sender device may be configured to input an enriched call elements parameter into the RCS message. In such embodiments, SIP need not be extended.

The techniques described herein for adding enriched call elements (e.g., enriched call data) to voice or video calls make use of existing telecommunications infrastructure and also support seamless inclusion of additional data. Enriched call elements such as voice or video call importance, voice or video call subject matter, GPS location, photos, videos, and other data may thus be included with a voice or video call in a more convenient manner for users. Advantageously, such embodiments permit efficient use of available network bandwidth by utilizing pre-existing SIP INVITE messages or SIP MESSAGE messages, rather than using additional dedicated communication streams. The recipient of the voice or video call may use the additional information provided by the enriched call elements to determine whether to answer the voice or video call.

In some embodiments, the RCS capabilities of senders or recipients may be indicated within the UE contact phonebook. Alternatively, the service provider may utilize a subscription-based or account-based approach in which the UE device accesses a home subscriber server (HSS), a presence server (PS), or Home Location Register (HLR) to obtain subscription-level or account-level information pertaining to enriched call elements for voice or video calls. That is, the sender or recipient may login to their account to specify enriched call elements on a sender basis or recipient basis (i.e., at a subscription-level) or independent of sender/recipient (i.e., at an account-level). In such embodiments, neither the SIP nor the format of the RCS message needs to be adjusted. In another embodiment, a subscription-based approach may be supported in a PS, where a database may store the UEs subscription to this service in addition to storing the capabilities of the UEs.

As an example of the subscription-based approach, if Alice (sender) knows that Bob (recipient) would prefer to receive a calls subject message prior to answering a call from her, the HLR, HSS, or PS may assign such enriched call elements to calls from Alice to Bob using their account numbers, phone numbers, or other suitable identifiers. Similarly, the Ace delivery service (sender) may want to transmit GPS coordinates with every phone call. The HSS or PS database would indicate appropriate enriched call elements for all outgoing calls from Ace delivery. Advantageously, such embodiments permit efficient use of available network bandwidth by utilizing the existing HSS or PS, rather than using additional dedicated communication streams.

FIG. 1 illustrates an example telecommunication system 100, which may be provided and/or supported by one or more telecommunications service providers. The system 100 includes an RCS messaging server (RMS) 108 that provides communications between multiple RCS capable devices such as user equipment (UE) devices (including sender device 102 and recipient device 104) via one or more networks 106, as well as an optional IMS Core Network 120 and an optional HSS 112 and Mobile Switching Center (MSC) Server (MSS) 130 that support voice or video connectivity. The system 100 may also include an optional presence server (PS) 114 to facilitate determination of device capabilities regarding enriched call elements and an optional file storage server 118 for efficient communication of some enriched call elements (e.g., electronic photographs or videos).

The system 100 may also include a business data server 160 which contains data specifically designed for the operating companies enterprise customers, such as a logo, Uniform Resource Locators (URLs), vCards or jCards (JSON based vCards) or subject matter which may be added as enriched data to messages and calls originating from enterprise customers. The system 100 may additionally include a validation server 140 which, in some embodiments additionally provide encryption/decryption services, may verify customer service agreements, and may use a Telephone number Proof of Possession (TnPOP) certificate, a delegated certificate, may verify digital signatures, or use various other methods to enable the originating service provider to verify outbound calls.

The various components of the telecommunication system 100 may be communicatively connected via a plurality of communication links 116 and additional communication links 122, 124, 126, and 128. For ease of explanation, UE devices may include a sender device 102 that can be operated by a sender user and a recipient device 104 that can be operated by a recipient user in the following discussion. Communications may be between UE devices of the same service provider and/or may be between UE devices supported by different originating and terminating service providers.

The UE devices 102 and 104 may include any suitable mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, smart watches, etc.), and/or similar devices. Although this description predominantly describes the UE devices 102 and 104 as being "mobile" or "wireless," (e.g., configured to be carried and moved around), it is to be appreciated that the UE devices 102 and 104 may represent various types of communication devices that are generally stationary as well, such as smart speakers, televisions, desktop computers, game consoles, set top boxes, smart home appliances (e.g., smart refrigerators, ovens, washing machines, dryers), and the like. UE devices 102 and 104 can include user cellular equipment or other telecommunications or computing devices communicatively connectable with other computing devices via the RMS 108.

Each of the UE devices 102 and 104 (as well as RMS 108) may be configured to communicate with the one or more networks 106 via one or more communication links 116. The one or more networks 106 may include an access network, a core network, and/or an Internet network. Example access networks include LTE, WIFI, GSM EDGE Radio Access Network (GERAN), UMTS Terrestrial Radio Access Network (UTRAN), and other cellular access networks. A cellular network may provide wide-area wireless coverage using a technology such as GSM, Code Division Multiple Access (CDMA), UMTS, LTE, 5G NR, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VOIP, VOLTE, IEEE 802.1x protocols, wireless microwave access (WIMAX), WIFI, and/or any future IP-based network technology or evolution of an existing IP-based network technology. The one or more communication links 116 in some examples propagate electromagnetic signals that utilize various protocols, such as LTE, Internet Protocol (IP), Session Initiation Protocol (SIP), or other suitable protocols.

Each of the UE devices 102 and 104 may also include one or more processors (e.g., microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs)) and one or more computer readable media (e.g., RAM, ROM, EEPROM, flash memory or other memory technology). The computer readable media may be used to store data and to store instructions that are executable by the one or more processors to perform various functions as described herein. For instance, the computer readable media may store information of one or more capabilities or preferred or available session attributes of the UE devices 102 and 104, such as credentials used for access, e.g., to IMS or RCS services.

The computer readable media may also store one or more native client applications and a user interface (UI), such as a touchscreen or other device for presenting information to a user and receiving commands from the user, associated with the one or more native client applications. This would include, for example, presenting to the user a photo, a video, a URL, a vcard or jcard, a map, a subject matter of the call or an indication of the importance of the call. The computer readable media may also include prompts to insert additional enriched call elements, such as, for example the importance (i.e., priority level) of the call or the subject matter of the call when a voice or video call is initiated. The recipient device 104 may, in addition, choose a special notification or choose to deactivate the Do Not Disturb functionality of the device if a call designated as important is received. One of the native client applications may permit a user to originate and terminate communication sessions associated with the UE device. In some examples, the native client application may include computer instructions that, when executed, cause the UE device to transmit a service message indicating the destination and the information of the session attribute to the RMS 108.

A session attribute may indicate a type, identity, capability, or party of a communication session determined by or at the request of a party of the communication session, or determined in response to a message from a party of the communication session. To permit a user to originate and terminate communication sessions associated with the UE device, the UI may include a session-initiating user interface control (e.g., a touchscreen button), to indicate that a communication session should be initiated. When a sender of sender device 102 desires to notify a recipient of recipient device 104, sender device 102 transmits an initiation request in response to actuation by the sender of a "send" control. The initiation request is an example of a service message of a communication session. A service message includes information of a destination, e.g., recipient device 104 with which sender device 102 is requesting a session be established. The service message may also include information of a session attribute, e.g., one or more media capabilities of the sender device 102 or protocol types of the communication session. In an example, the service message includes a SIP INVITE message having a Session Description Protocol (SDP) body including a session description, e.g., the information of the session attribute. In an example, for a message from Alice to Bob, the session attributes can include Alice as the sender, Bob as the recipient, and a protocol identifier indicating whether the message is being carried via the RCS Message Session Relay Protocol (MSRP). The RMS 108 may direct the messages between the UE devices 102 and 104 based on the session attribute.

The one or more native client applications may additionally include computer instructions that, when executed, cause the UE device to transmit a message with enriched call elements concurrent to a voice or video call. The RMS 108 is communicatively coupled with UE devices 102 and 104, and may be configured to receive, from sender device 102 of a communication session, a service message including information of a first session attribute and associated with identification information of recipient device 104 of the communication session. The RMS 108 can retrieve, from an authorization registry, authorization information corresponding to the identification information. In response to the authorization information indicating the first capability is not permitted, the RMS 108 can determine a status message based at least in part on the service message, and transmit the status message via a communications interface.

Figure 2:
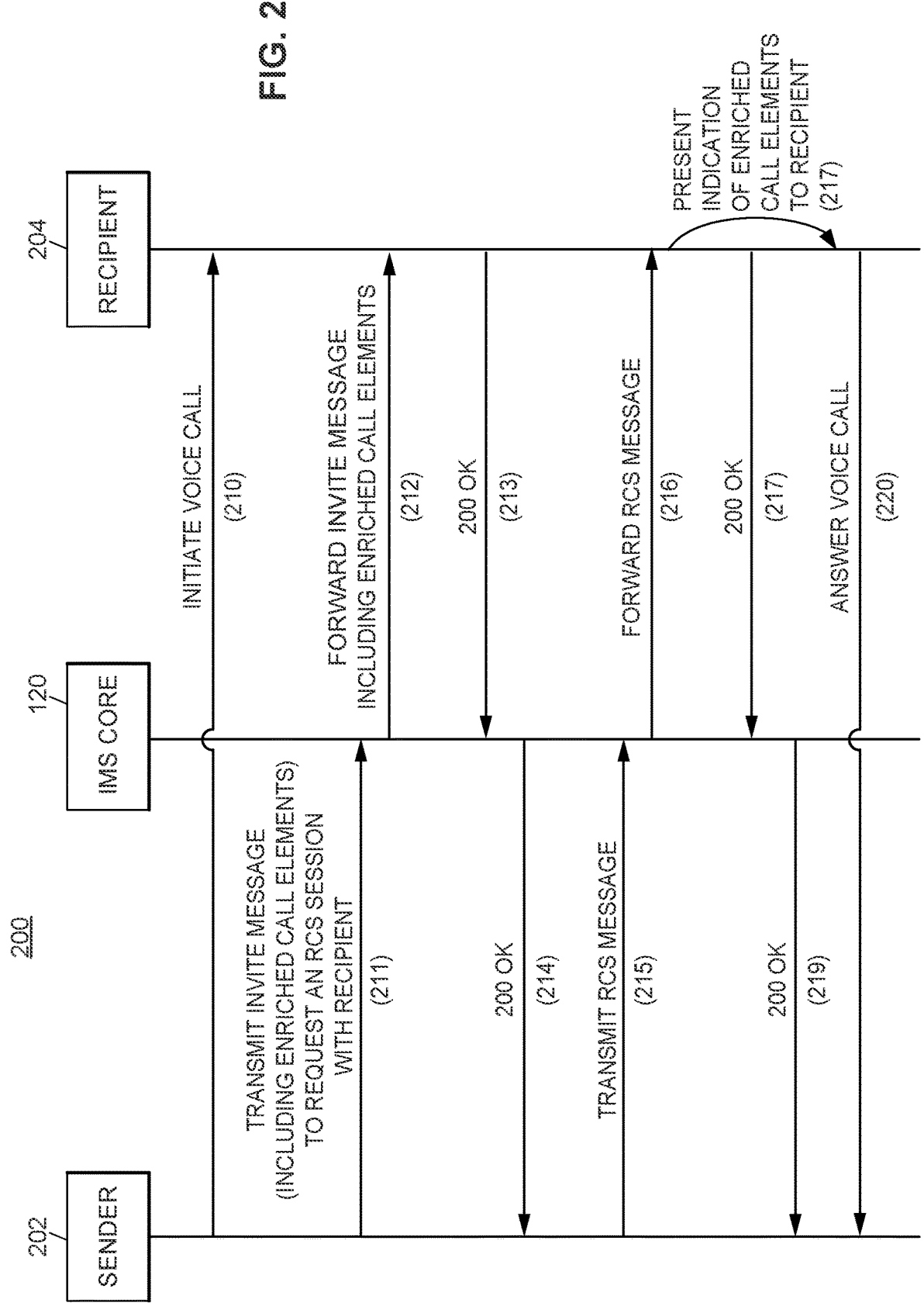
FIG. 2 illustrates a ladder diagram of a session-based enriched call elements inclusion method for adding enriched call elements to a voice or video call.

FIG. 2 illustrates a ladder diagram of a session-based enriched call elements inclusion method 200 for adding enriched call elements to a voice or video call. The method 200 illustrates communication between a sender 202 and a recipient 204, which may be the sender device UE 102 and the recipient device UE 104, respectively. Likewise, the IMS Core 120 may include the I-CSCF, S-CSCF, P-CSCF, Application Servers, Subscriber Line Functions (SLF), Breakout Gateway Control function (BGCF), Media Gateway Control Function (MGCF), and Multimedia Resource Function Controller (MRFC), and may also include other network elements. For the example embodiments of FIG. 2 and FIG. 3, the IMS Core 120 also includes the RMS 108 such that, in these examples, the illustrated methods use the IMS Core 120 for RCS message delivery. Each communication message or signal may be sent and received via various components of a telecommunications network according to the existing standards and protocols. Additional, fewer, or alternative communications or actions may be included in alternative embodiments.

The method 200 begins with the sender 202 sending a message to initiate a voice or video call with the recipient 204 (line 210). To add enriched call elements to the voice or video call, the sender 202 also transmits an invite message that includes one or more enriched data parameters indicating the enriched call elements to the IMS Core 120 (line 211), which invite message is then forwarded by the IMS Core 120 to the recipient 204 (line 212). The enriched data parameters may include the enriched data of the enriched call elements or may provide an indication of the enriched call elements (e.g., a pointer indicating a location from which to retrieve the enriched call elements, such as a file stored in the file storage server 118). The invite message may be used to establish an RCS session between the sender 202 and the recipient 204. Thus, the invite message may comprise a SIP INVITE message. Upon receiving the invite message, the recipient 204 responds by transmitting a 200 OK message or other acceptance message to the IMS Core 120 (line 213), which 200 OK message or other acceptance message is then forwarded by the IMS Core 120 to the sender 202 (line 214). Thus, an RCS session may be established between the sender 202 and the recipient 204. In some embodiments, the entirety of the enriched call elements may be included in the invite message. In other embodiments, part or all of the enriched call elements may be included in a subsequent message within the RCS session. In such embodiments, the sender 202 transmits an RCS message including part or all of the enriched call elements to the IMS Core 120 (line 215) after establishing the RCS session, and the IMS Core 120 forwards the RCS message to the recipient 204 (line 216).

The invite message and any subsequent RCS message may be automatically transmitted following initiation of the voice or video call to send enriched call elements indicated before the voice or video call. In some embodiments, the enriched call elements are specified for the particular voice or video call by input or selection by a user of the sender 202 prior to initiating the voice or video call. In other embodiments, the enriched call elements are specified at an earlier time for multiple calls (e.g., all outgoing calls from an account) or are automatically added to the voice or video call based upon settings previously configured (e.g., by determining a GPS location and adding the GPS location as an enriched call element based upon settings associated with the sender 202 or a user account associated with the sender 202). In some embodiments, the sender 202 may identify the recipient 204 as being capable of receiving enriched call elements prior to initiating the voice or video call or prior to receiving the enriched call elements for inclusion in the voice or video call. For example, the sender 202 may communicate with HSS 112 or PS 114 to obtain an indication that inclusion of the enriched call elements is supported by at least one of the sender 202 or the recipient 204 prior to initiating the voice or video call or prior to transmitting the invite message. In some embodiments, the sender 202 may be configured to prompt a user for enriched call elements for a voice or video call only after verifying the enriched call elements can be received by the recipient 204. In other embodiments, the sender device UE 102 may be an application running on one or more processors that generate a call or a message on behalf of a business. This may be useful, for example, in communicating with customers via a software-based telephony program running on a computer associated with the business. Such communication may be used to provide a reminder to one or more patients of an upcoming medical appointment, for example, or may be a reminder from an auto repair business to one or more automobile owners that their automobile service is completed. In some embodiments, the UE 102 may insert a custom SIP HEADER in the RCS messages that distinguishes the message from unwanted robo-calls and from those of individual subscribers and indicates the sender is a business having previously configured account settings to send enriched data identifying the business to the recipient of the call. Upon receiving this message containing the custom SIP HEADER, a network element, such as an IMS core network element of the operating company may take special action, such as routing the call to business data server 160. The business data server 160 may contain data specifically designed for the operating companies enterprise customers. The business data server 160 may insert additional enriched data to the message, such as a business logo, business photo, urgency indicator, subject matter, a vcard or jcard object, a Uniform Resource Locator (URL), or a map. Such enriched data may then be sent by the business data server 160 to be routed to the receiver UE 104 when initiating the call. This added information in the message may cause an additional action on the part of the receiver device UE 104 (such as displaying the logo, displaying the subject of the call or turning on an urgent indicator). The network element may additionally route messages with the customized SIP HEADER through a validation server 140 to perform validation or verification of the message or the sender, which may optionally include adding a visual designation that the call has been validated prior to delivering the message to a recipient device UE 104. This verification server 140 may additionally provide encryption/decryption services, may verify customer service agreements, and in some embodiments may use a Telephone number Proof of Possession (TnPOP) certificate, a delegated certificate, may verify digital signatures, or use various other methods to enable the originating service provider to verify outbound calls. This verification may be shared with a terminating service provider or directly with the recipient device UE 104 in combination with the enriched data from the business data server 160 to indicate the call is from a legitimate business and is not an unwanted "robo-call."

However received, the enriched call elements are presented to a user when received at the recipient 204 (line 227) and receipt of the Messages are confirmed by the 200 OK messages in line 217 and 219. The enriched call elements may first be extracted by the recipient 204 from a message in which they are included or may be retrieved from a file storage server 118. In alternative embodiments, the enriched call elements are presented to the user either prior to answering the voice or video call or concurrently with answering the voice or video call. Presentation of the enriched call elements depends upon the type of the enriched call elements. In various embodiments, the enriched call elements include one or more of the following types of enriched call elements or combinations thereof: an electronic photograph, a video clip, a geographical location (e.g., a GPS location of the first RCS-compatible device), a priority indicator indicating the importance of the voice or video call, or a subject of the voice or video call (e.g., a summary of the subject matter the sender wants to discuss on the voice or video call). When the enriched call elements include a geographical location, presenting the enriched call elements to the user may include generating and presenting a map indicating the geographical location to the user. When the enriched call elements include a subject of the voice or video call, the indicated subject may be presented to the user as text or text-to-voice or video audio to enable the user to determine whether to answer the voice or video call. Such information may be useful, for example, when the user has limited time or is currently on another call.

When the enriched call elements include a priority indicator, such priority indicator may indicate a priority level of the voice or video call (e.g., low, ordinary, high, or emergency). The sender may select the priority level for the call based upon the urgency or significance of the voice or video call, thereby enabling the recipient to know whether the call is important before deciding whether to answer the call. In some embodiments, presenting enriched call elements indicating the priority level may include causing a special notification to be presented to the user prior to answering the voice or video call. Such special indicator may include a special ring tone, vibration pattern, or graphical indicator on a display. In further embodiments, presenting enriched call elements indicating a high priority level may include causing a notification to be presented to the user when a voice or video call of a lower priority level would not trigger any notification to be presented (e.g., when the user has set the device to silent or "do not disturb" mode). Thereby, important voice or video calls may be immediately indicated to the recipient, despite the current settings at the recipient device.

The recipient 204 then sends a response message to the sender 202 to answer the voice or video call (line 220) when the user decides to answer the call. Alternatively, the user may decide not to answer the voice or video call, in which case the call may be indicated as unanswered or may be routed to a voice or a video mailbox.

Figure 3:
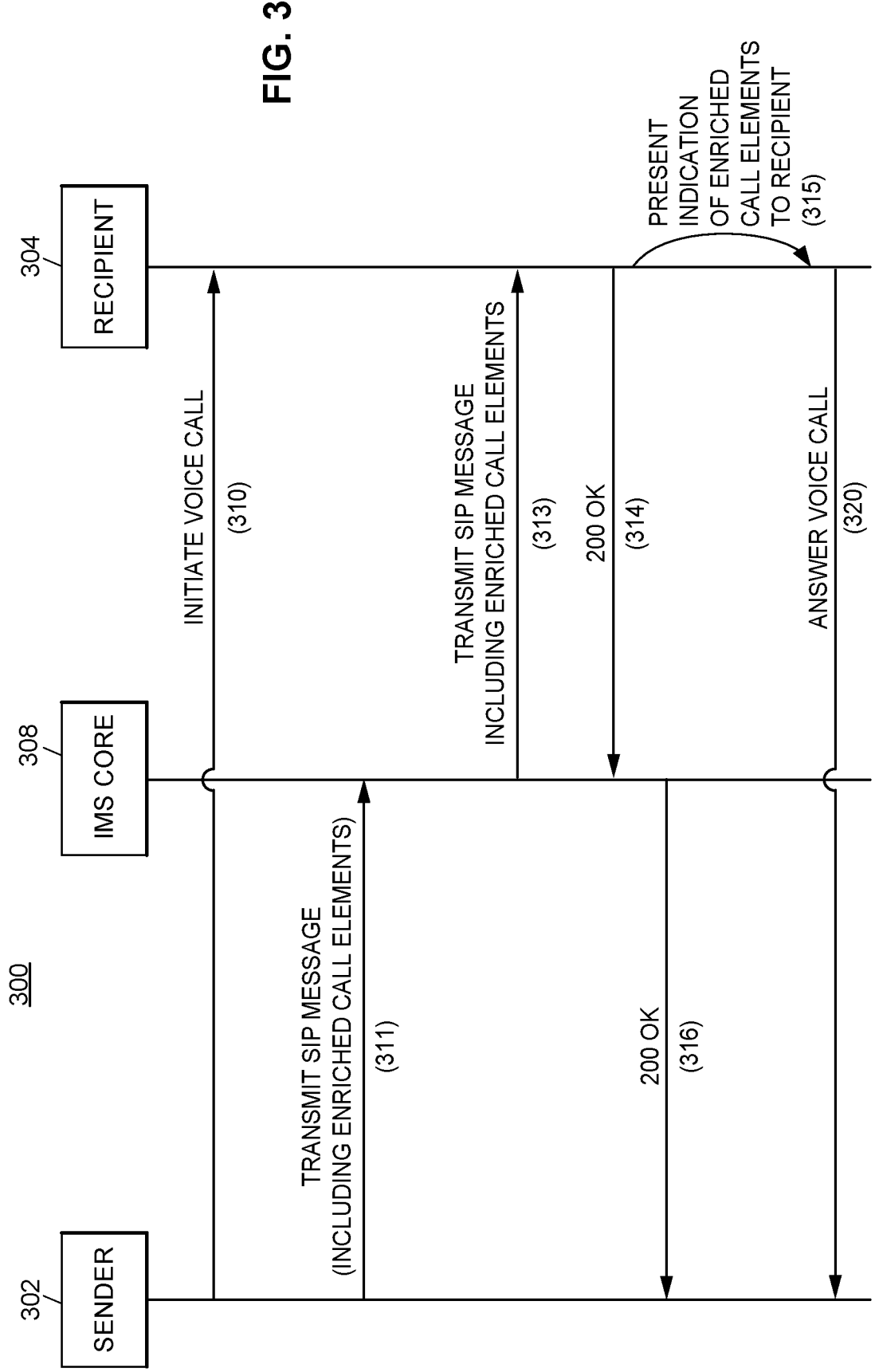
FIG. 3 illustrates a ladder diagram of a message-based enriched call elements inclusion method 300 for adding enriched call elements to a voice or video call.

FIG. 3 illustrates a ladder diagram of a message-based enriched call elements inclusion method 300 for adding enriched call elements to a voice or video call. The method 300 is similar to the method 200, except an RCS session need not be established. For example, a stand-alone instant message may be sent to transmit the enriched call elements for a voice or video call. The method 300 illustrates communication between a sender 302 and a recipient 304, which may be the sender device UE 102 and the recipient device UE 104, respectively. Likewise, the RMS 308 may be the RMS 108. Each communication message or signal may be sent and received via various components of a telecommunications network according to existing standards and protocols. Additional, fewer, or alternative communications or actions may be included in alternative embodiments.

The method 300 begins with the sender 302 sending a message to initiate a voice or video call with the recipient 304 (line 310). To add enriched call elements (e.g., subject matter or priority level indication) to the voice or video call, the sender 302 may transmit an instant message (i.e., a SIP MESSAGE) containing the enriched call elements (e.g., as enriched data parameters) to the RMS 308 (line 311), which instant message is forwarded from the RMS 308 to the recipient 304 (line 313). Alternately, the sender 302 may transmit an instant message containing a pointer to the data (e.g., a uniform resource locator (URL)) as part of the instant message or a pointer to a location in a file storage server 118 accessible to the recipient 304 where the enriched call element was previously stored (e.g., by being uploaded from the sender 302). The instant message (i.e., the SIP MESSAGE) may be independent of or part of a session previously established by a standard SIP INVITE, as discussed above. The RMS 308 sends a "200 OK" message or other acceptance message to the sender 302 (line 311) to confirm receipt of the instant message. Upon receiving the instant message (i.e., the SIP MESSAGE), the recipient 304 similarly transmits a "200 OK" message or other acceptance message to the RMS 308 confirming receipt (line 314). The recipient 304 then presents an indication of the enriched call element to the user (line 315), as discussed elsewhere herein.

The recipient 304 then sends a response message to the sender 302 to answer the voice or video call (line 320) when the user decides to answer the call. Alternatively, the user may decide not to answer the voice or video call, in which case the call may be indicated as unanswered or may be routed to voice or a video mailbox.

In certain described embodiments, enriched call element services, such as subject matter or an importance indicator, within the RCS messaging infrastructure facilitate sending enriched call elements from an RCS-compatible sender device to a legacy recipient device, such as to a short message service (SMS)-but not a RCS-compatible device. In such embodiments, the RMS may obtain enriched call elements in any of the manners described above. However, to support legacy recipient devices, the RMS may forward messages to a legacy server, such as an SMS center (SMSC), which in turn delivers the message into a format suitable for the legacy recipient device.

Figure 4:
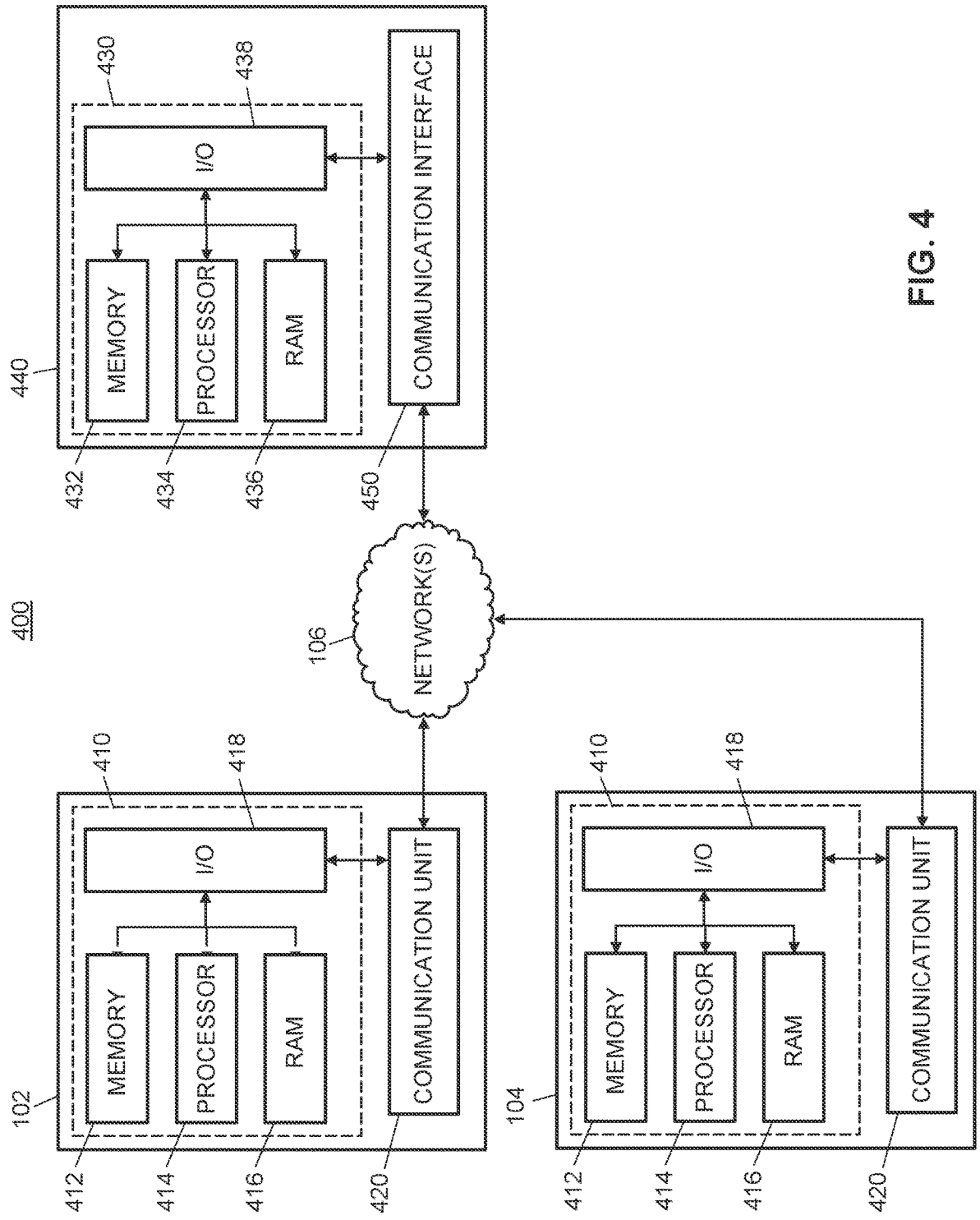
FIG. 4 illustrates a block diagram illustrating an example communication system showing further details of certain components within the telecommunication system.

FIG. 4 illustrates a block diagram of an example communication system 400 showing further details of certain components within the telecommunication system 100. The communication system 400 includes the sender device 102 and the recipient device 104, which are each connected via a network 106 to a telecommunications application server 440. The telecommunications application server 440 may be a computing device within the telecommunication system 100 configured to implement part or all of the functions associated with the RMS 108, the IMS Core Network 120, or other functions. Additional or alternative components may be included in various embodiments.

Each UE device 102 or 104 may be a mobile telephony and computing device, such as a smartphone, a network-enabled tablet computer, or similar mobile device capable of receiving and processing electronic information through a wireless network. Each UE device 102 or 104 includes a controller 410 that stores and processes electronic data and a communication unit 420 that communicates with external computing devices (e.g., other UE devices) via the network 106. In addition, each UE device 102 or 104 may further include input and output components, internal sensors, or other components to enhance the functionality of the UE that are not shown in FIG. 4.

The controller 410 receives, processes, produces, transmits, and stores data. The controller 410 includes a memory 412 storing processor-executable instructions in a non-transitory, tangible computer-readable medium, one or more processors 414 configured to execute computer-readable instructions, a random access memory (RAM) 416 for temporary memory, and an I/O circuit 418. The components of the controller 410 may be interconnected via an address/data bus or other means. It should be appreciated that although FIG. 4 depicts only one processor 414, the controller 410 may include multiple processors 414 in some embodiments. Similarly, the controller 410 may include multiple RAMs 416 and multiple memories 412. Although the communication system 400 depicts the I/O circuit 418 as a single block, the I/O circuit 418 may include a number of different I/O circuits, which may be configured for specific I/O operations. The processor 414 may include one or more processors of any known or hereafter developed type, including general-purpose processors or special-purpose processors. Similarly, the controller 410 may implement the RAM 416 and memory 412 as semiconductor memories, magnetically readable memories, optically readable memories, or any other type of memory.

The communication unit 420 manages communication between the controller 410 and external devices communicatively connected to the UE device 102 or 104 via the network 106. The communication unit 420 may transmit and receive wired or wireless communications with external devices, using any suitable wireless communication protocol network, such as a wireless telephony network (e.g., GSM, CDMA, LTE, 5G, etc.), a Wi-Fi network (802.11 standards), a WiMAX network, etc. In addition, the controller 410 of the UE device 102 or 104 may further be configured to communicate data through the communication unit 420 using any suitable data protocol. Furthermore, the communication unit 420 may provide input signals to the controller 410 via the I/O circuit 418.

The telecommunications application server 440 likewise includes a controller 430 that stores and processes electronic data and a communication interface 450 that communicates with external computing devices (e.g., UE devices 102 and 104) via the network 106. As with the UE devices 102 and 104, the controller 430 of the telecommunications application server 440 receives, processes, produces, transmits, and stores data. The controller 430 includes a memory 432, a processor 434, a RAM 436, and an I/O circuit 438, each configured and operating analogously to the corresponding components of the controller 410 described above. The telecommunications application server 440 also includes a communication interface 450 configured to send and receive communications between the telecommunications application server 440 and external computing devices via a data network connection (e.g., network 106). In some embodiments, the network 106 may be configured in accordance with a new radio (5G NR) protocol, and the communication interface 450 may interface with a core network of the communication network. The communication interface 450 may include software and hardware components configured to enable communication via the network 106 using standard or specialized communication protocols, such as those discussed above with respect to the communication units 420.

The embodiments described above may be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly, impliedly, or inherently set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. For example, UE devices 102 and 104 may be thin client devices, or such UE devices 102 and 104 may perform some functionalities of the RMS and therefore be implemented as thick client devices. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be any of X, Y, or Z, or any combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

Finally, the patent claims at the end of this patent application are not intended to be construed under 35 U.S.C. § 112(f), unless traditional means-plus-function language is expressly recited, such as "means for" or "step for" language being explicitly recited in the claim.

What is claimed is:

1. A computer-implemented method for adding rich communication services (RCS) data to voice or video calls, the method comprising:
   receiving, at a network component of a telecommunications network from a user controlling a sender account, a specification of one or more enriched call elements to be included in messages sent from RCS-compatible devices associated with the sender account;
   storing, at the network component of a telecommunications network, an enriched call element setting associated with voice or video calls initiated by devices associated with a sender account and indicating the one or more enriched call elements to include in the messages sent from the RCS-compatible devices associated with the sender account;
   initiating, by a first RCS-compatible device distinct from the network component and associated with the sender account, a voice or video call from the first RCS-compatible device to a second RCS-compatible device;
   sending, from the first RCS-compatible device distinct from the network component and to the second RCS-compatible device, an invite message to request an RCS session;
   receiving, at the first RCS-compatible device, an acceptance message in response to the invite message; and
   adding, by the network component and based upon the enriched call element setting associated with the sender account, the one or more enriched call elements indicative of an aspect of a content of the voice or video call to a message to the second RCS-compatible device in the RCS session, wherein the one or more enriched call elements comprise one or more of the following: an electronic photograph, a video clip, an indication in metadata that a business user is calling, or a geographical location of the first RCS-compatible device,
   wherein receiving the enriched call elements causes the second RCS-compatible device to present an indication of the enriched call elements to a user of the second RCS-compatible device and make the enriched call elements available in a call log of the second RCS-compatible device after the voice or video call.

2. The computer-implemented method of claim 1, wherein receiving the enriched call elements causes the second RCS-compatible device to present the indication of the enriched call elements prior to answering the voice or video call.

3. The computer-implemented method of claim 1, wherein adding the enriched call elements to a message to the second RCS-compatible device comprises automatically sending, from the first RCS-compatible device to the second RCS-compatible device, an RCS message after receiving the acceptance message.

4. The computer-implemented method of claim 1, wherein the network component is a business data server and wherein adding the one or more enriched call elements to the message to the second RCS-compatible device comprises:
   adding, by the first RCS-compatible device, a custom header field to the message;

sending the message, by the first RCS-compatible device to the business data server;

adding, by the business data server, the one or more enriched call elements; and sending, from the business data server to the second RCS-compatible device, an RCS message containing the enriched call elements.

5. The computer-implemented method of claim 1, wherein adding the enriched call elements to a message to the second RCS-compatible device comprises automatically adding the enriched call elements to the invite message.

6. The computer-implemented method of claim 1, wherein the one or more call element comprise a priority indicator associated with a priority level of the voice or video call, and wherein receiving the priority indicator causes the second RCS-compatible device to indicate the priority level of the voice or video call by a special notification at the second RCS-compatible device prior to answering the voice or video call.

7. The computer-implemented method of claim 1, further comprising:

identifying, at the first RCS-compatible device, the second RCS-compatible device by obtaining from a home subscriber server an indication that inclusion of the enriched call elements is supported by at least one of the first RCS-compatible device or the second RCS-compatible device.

8. A non-transitory, tangible computer-readable medium storing executable instructions for adding rich communication services (RCS) data to voice or video calls that, when executed by one or more processors of a first RCS-compatible device, cause the first RCS-compatible device to:

initiate a voice or video call from the first RCS-compatible device to a second RCS-compatible device;

send an invite message to the second RCS-compatible device to request an RCS session;

receive an acceptance message in response to the invite message; and cause a network element of a telecommunications network distinct from the first RCS-compatible device and the second RCS-compatible device to add one or more enriched call elements indicative of an aspect of a content of the voice or video call to a message to the second RCS-compatible device in the RCS session based upon a previously stored enriched call element setting of a sender account associated with the first RCS-compatible device and indicating one or more enriched call elements to include in messages sent from RCS-compatible devices associated with the sender account, wherein the one or more enriched call elements comprise one or more of the following: an electronic photograph, a video clip, an indication in metadata that a business user is calling, or a geographical location of the first RCS-compatible device, wherein receiving the enriched call elements causes the second RCS-compatible device to present an indication of the enriched call elements to a user of the second RCS-compatible device and make the enriched call elements available in a call log of the second RCS-compatible device after the voice or video call.

9. The non-transitory, tangible computer-readable medium of claim 8, wherein receiving the enriched call elements causes the second RCS-compatible device to present the indication of the enriched call elements prior to answering the voice or video call.

10. The non-transitory, tangible computer-readable medium of claim 8, wherein the executable instructions that cause the first RCS-compatible device to add the enriched call elements to a message to the second RCS-compatible device further cause the first RCS-compatible device to automatically send an RCS message after receiving the acceptance message.

11. The non-transitory, tangible computer-readable medium of claim 8, wherein the enriched call elements comprise a priority indicator associated with a priority level of the voice or video call as selected by a sender associated with the first RCS-compatible device prior to initiating the voice or video call.

12. The non-transitory, tangible computer-readable medium of claim 11, wherein receiving the priority indicator causes the second RCS-compatible device to indicate the priority level of the voice or video call by a special notification at the second RCS-compatible device prior to answering the voice or video call.

13. A rich communication services (RCS) compatible device, comprising:

one or more processors;

a communication component configured to communicate via a telecommunications network; and a program memory coupled to the one or more processors and storing executable instructions that, when executed by the one or more processors, cause the RCS-compatible device to:

receive a voice or video call from a second RCS-compatible device via the communication component;

receive an invite message from the second RCS-compatible device to request an RCS session via the communication component;

send an acceptance message in response to the invite message via the communication component;

receive one or more enriched call elements in a message indicative of an aspect of a content of the voice or video call from the second RCS-compatible device in the RCS session prior to answering the voice or video call, wherein the one or more enriched call elements are added to the message by a network element of a telecommunications network distinct from the RCS-compatible device and the second RCS-compatible device based upon a previously stored enriched call element setting of a sender account associated with the second RCS-compatible device and indicating one or more enriched call elements to include in messages sent from RCS-compatible devices associated with the sender account, wherein the one or more enriched call elements comprise one or more of the following: an electronic photograph, a video clip, an indication in metadata that a business user is calling, or a geographical location of the second RCS-compatible device, wherein the enriched call elements include a global positioning system (GPS) location associated with the second RCS-compatible device;

in response to receiving the enriched call elements, present an indication of the enriched call elements to a user of the RCS-compatible device prior to answering the voice or video call, wherein the presenting includes generating and presenting, based on the GPS location, a map that indicates the GPS location; and in response to receiving the enriched call elements, make the enriched call elements available in a call log of the second RCS-compatible device after the voice or video call.

14. The RCS-compatible device of claim 13, wherein the executable instructions that cause the RCS-compatible device to receive enriched call elements further cause the RCS-compatible device to extract the enriched call elements from either the invite message or a subsequent message from the second RCS-compatible device.

15. The RCS-compatible device of claim 13, wherein:
the enriched call elements include a priority indicator associated with a priority level of the voice or video call as selected by a sender associated with the second RCS-compatible device; and
the indication of the enriched call elements includes a special notification to the user of the RCS-compatible device.

\* \* \* \* \*